(12) United States Patent
Anraku

(10) Patent No.: US 9,975,571 B2
(45) Date of Patent: May 22, 2018

(54) STEERING CONTROL APPARATUS

(71) Applicant: JTEKT CORPORATION, Osaka-shi, Osaka (JP)

(72) Inventor: Koji Anraku, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 0 days. days.

(21) Appl. No.: 15/612,653

(22) Filed: Jun. 2, 2017

(65) Prior Publication Data

US 2017/0355395 A1 Dec. 14, 2017

(30) Foreign Application Priority Data

Jun. 10, 2016 (JP) .................................. 2016-116146
Dec. 16, 2016 (JP) .................................. 2016-244480

(51) Int. Cl.
| | |
|---|---|
| *A01B 69/00* | (2006.01) |
| *B62D 6/00* | (2006.01) |
| *B62D 11/00* | (2006.01) |
| *B62D 5/04* | (2006.01) |
| *H02P 27/06* | (2006.01) |
| *B62D 3/12* | (2006.01) |

(52) U.S. Cl.
CPC ........... *B62D 5/0463* (2013.01); *B62D 5/049* (2013.01); *B62D 5/0484* (2013.01); *B62D 5/0487* (2013.01); *B62D 5/0496* (2013.01); *H02P 27/06* (2013.01); *B62D 3/126* (2013.01)

(58) Field of Classification Search
CPC ...... B62D 5/0463; B62D 5/0484; B62D 5/00; H02P 27/06
USPC .......................................................... 701/42
See application file for complete search history.

(56) References Cited

U.S. PATENT DOCUMENTS 5,398,953 A * 3/1995 Shimizu ............... B62D 5/0463
180/446
5,513,720 A * 5/1996 Yamamoto ............... B62D 6/02
180/421

(Continued)

FOREIGN PATENT DOCUMENTS

EP 2 987 702 A1 2/2016
JP S55-32294 B2 8/1980

(Continued)

OTHER PUBLICATIONS

Nov. 22, 2017 Extended European Search Report issued in Application No. 17175001.1.

*Primary Examiner* — Isaac G Smith
(74) *Attorney, Agent, or Firm* — Oliff PLC

(57) ABSTRACT

Using an update amount, an update amount calculating circuit manipulates a phase-control angle so as to perform feedback control such that a steering torque corresponds to a target torque. The steering torque is obtained by reducing a steering torque in magnitude by a predetermined value. The phase-control angle is used to convert a current command value to a value of a fixed coordinate system, for example. Using a guard value, a guard processing circuit performs a guard process on a current command value set by a command value setting circuit, so that the current command value becomes the current command value. The guard value is used to determine an appropriate range for a variation in the current command value in accordance with an amount by which the steering torque exceeds in magnitude the target torque.

7 Claims, 8 Drawing Sheets

(56) References Cited

U.S. PATENT DOCUMENTS

2015/0367881 A1* 12/2015 Tsunoda .............. B62D 5/0487
701/43
2017/0113715 A1   4/2017 Yamano et al.

FOREIGN PATENT DOCUMENTS

JP        5532294 B2   6/2014
JP     2017-087764 A   5/2017

* cited by examiner

STEERING CONTROL APPARATUS

INCORPORATION BY REFERENCE

The disclosures of Japanese Patent Applications No. 2016-116146 filed on Jun. 10, 2016 and No. 2016-244480 filed on Dec. 16, 2016, including the specifications, drawings and abstracts, are incorporated herein by reference in its entirety.

BACKGROUND OF THE INVENTION

1. Field of the Invention

The invention relates generally to steering control apparatuses. More particularly, the invention relates to a steering control apparatus for controlling a steering device to assist a driver in steering a vehicle.

2. Description of the Related Art

Japanese Patent No. 5532294, for example, discloses a control apparatus that performs feedback control such that a steering torque detection value corresponds to a target torque. To perform such feedback control, the control apparatus is configured to manipulate a phase-control angle to be input to a current feedback controller to cause a synchronous motor to generate an assist torque. The control apparatus performs torque feedback control so as to carry out sensorless control of the synchronous motor. The coordinate axes of a coordinate system that rotates in accordance with the phase-control angle are defined as a $\gamma$ axis and a $\delta$ axis. A current command value for the $\gamma$ axis is greater than zero, and a current command value for the $\delta$ axis is zero. Thus, a q axis current flows in accordance with the amount of misalignment between the $\gamma$ axis and d axis, so that the q axis current causes the synchronous motor to generate a torque. The amount of misalignment between the $\gamma$ axis and d axis is adjustable in accordance with the phase-control angle. This means that manipulating the phase-control angle by torque feedback control enables adjustment of the amount of misalignment between the $\gamma$ axis and d axis, thus making it possible to control the torque generated by the synchronous motor.

Suppose that the absolute value of a difference between the steering torque detection value and the target torque is equal to or greater than a predetermined value. In this case, determining that a control failure has occurred, the control apparatus carries out the process of reducing the current command value for the $\gamma$ axis. This process aims to reduce a control gain so as to facilitate convergence of the phase-control angle to a suitable value (see paragraph [0064] of Japanese Patent No. 5532294).

In the event of what is called a systematic error, such as an abnormal parameter or an abnormal logic for a controller to perform torque feedback control mentioned above, for example, the control apparatus fails to suitably control the torque generated by the synchronous motor. In particular, in the event of an error where the current command value for the $\gamma$ axis is excessively small, the $\gamma$ axis current decreases accordingly. This reduces the variation in torque caused by manipulation of the phase-control angle, thus making it impossible to suitably control the torque generated by the synchronous motor.

SUMMARY OF THE INVENTION

An object of the invention is to provide a steering control apparatus configured to, even if a current command value is abnormal because of a systematic error, prevent a situation where assist control cannot be carried out.

Solutions to the above problems and effects of the solutions will be described below.

An aspect of the invention provides a steering control apparatus for controlling a steering device to assist a driver in steering a vehicle. The steering device includes a synchronous motor to generate an assist torque, and a power converting circuit to apply a voltage to the synchronous motor. The steering control apparatus includes a current control circuit, a phase-control angle manipulating circuit, a command value setting circuit, and a guard processing circuit. The current control circuit is configured to manipulate a voltage to be applied to the synchronous motor from the power converting circuit so as to adjust a current flowing through the synchronous motor to a current command value. The phase-control angle manipulating circuit is configured to manipulate a phase-control angle so as to perform feedback control such that a detection value of a steering torque corresponds to a target torque. The phase-control angle determines a phase of the current command value. The steering torque is a torque input to a steering shaft of the steering device. The command value setting circuit is configured to increase an absolute value of the current command value on condition that an amount by which the detection value exceeds in magnitude the target torque is equal to or greater than a threshold value, and reduce the absolute value of the current command value on condition that the exceeding amount is smaller than the threshold value. The guard processing circuit is configured to perform a guard process on the current command value set by the command value setting circuit, in a manner that does not permit a reduction in the absolute value of the current command value. The guard process is performed on condition that the exceeding amount is equal to or greater than the threshold value.

The guard process is carried out using logic different from logic used by the command value setting circuit in setting the current command value. Thus, if the command value setting circuit has developed a systematic error, such as an error in its logic, the value subjected to the guard process by the guard processing circuit would be an appropriate value. For example, suppose that two command value setting circuits that use the same logic are prepared, and values set by the two command value setting circuits are compared with each other. In such a case, the reliability of the comparing process is low. The above aspect, however, does not involve such a comparing process. Accordingly, if the current command value is abnormal because of a systematic error, the above aspect would prevent a situation where assist control is impossible.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
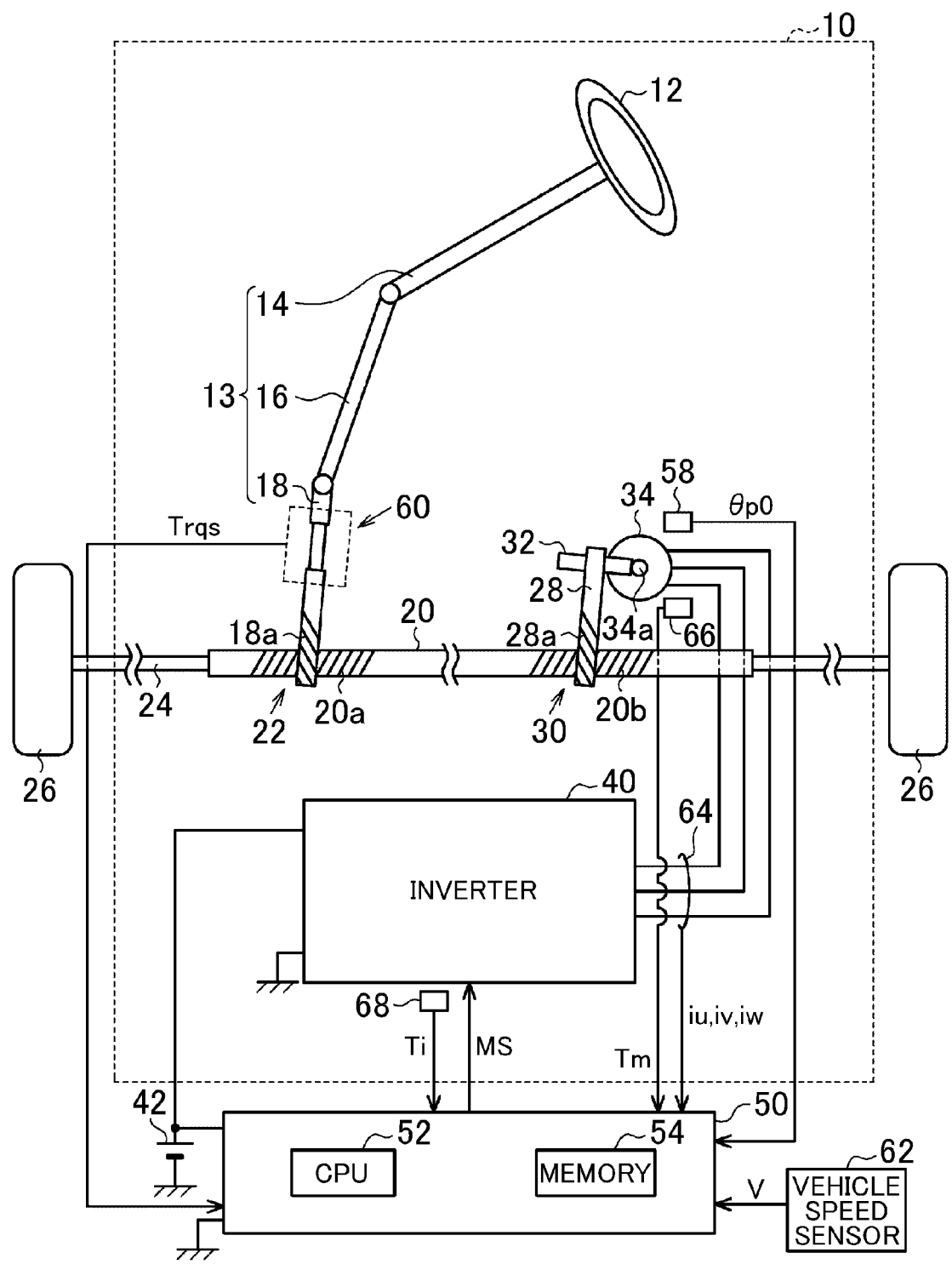
FIG. 1 is a schematic diagram illustrating a steering system including a steering control apparatus according to a first embodiment of the invention.

A steering control apparatus according to a first embodiment of the invention will be described below with reference to the drawings. As illustrated in FIG. 1, a steering device 10 according to this embodiment includes a steering wheel 12, a steering shaft 13, and a rack shaft 20. The steering wheel 12 is secured to the steering shaft 13. The rack shaft 20 axially reciprocates in response to rotation of the steering shaft 13. The steering shaft 13 includes a column shaft 14, an intermediate shaft 16, and a pinion shaft 18. The column shaft 14 is coupled to the steering wheel 12. The intermediate shaft 16 is coupled to the column shaft 14. The pinion shaft 18 is coupled to the intermediate shaft 16.

The pinion shaft 18 is disposed such that power is transmittable to the rack shaft 20. Specifically, the rack shaft 20 and the pinion shaft 18 are disposed to intersect each other at a predetermined angle. The rack shaft 20 is provided with first rack teeth 20a. The pinion shaft 18 is provided with pinion teeth 18a. Meshing of the first rack teeth 20a with the pinion teeth 18a provides a first rack and pinion mechanism 22. Tie rods 24 are each coupled to an associated one of the ends of the rack shaft 20. Ends of the tie rods 24 are coupled to knuckles (not illustrated). Steered wheels 26 are each assembled to an associated one of the knuckles. A driver operates the steering wheel 12 so as to cause rotation of the steering shaft 13. The first rack and pinion mechanism 22 converts the rotation of the steering shaft 13 into an axial displacement of the rack shaft 20. The axial displacement of the rack shaft 20 is transmitted to the knuckles through the tie rods 24. This results in a change in the steered angle of the steered wheels 26, i.e., a change in the direction of travel of a vehicle.

The rack shaft 20 is disposed to intersect a pinion shaft 28 at a predetermined angle. The rack shaft 20 is further provided with second rack teeth 20b. The pinion shaft 28 is provided with pinon teeth 28a. Meshing of the second rack teeth 20b with the pinon teeth 28a provides a second rack and pinion mechanism 30. The pinion shaft 28 is connected to a rotation shaft 34a of a synchronous motor 34 through a reduction mechanism 32, such as a worm gear. The synchronous motor 34 is a three-phase surface permanent magnet synchronous motor (SPMSM).

The synchronous motor 34 is connected to a battery 42 through an inverter 40. The inverter 40 is a power converting circuit to convert the dc voltage of the battery 42 into an ac voltage and apply the ac voltage to the synchronous motor 34.

The steering control apparatus according to the first embodiment is a control apparatus 50. The control apparatus 50 includes a central processing unit (CPU) 52 and a memory 54. The control apparatus 50 operates the inverter 40 using, as a controlled variable, the torque of the synchronous motor 34, thus carrying out assist control so as to assist the driver in steering the steering wheel 12. In carrying out the assist control, the control apparatus 50 makes reference to values detected by various sensors. Examples of the sensors include: a rotation angle sensor 58 to detect a rotation angle θp0 of the rotation shaft 34a of the synchronous motor 34; a torque sensor 60 to detect a torque applied to the steering shaft 13 (i.e., a steering torque Trqs); and a vehicle speed sensor 62 to detect the travel speed of the vehicle (i.e., a vehicle speed V). The control apparatus 50 acquires values detected by a current sensor 64 to detect line currents (such as currents iu, iv, and iw) flowing between the inverter 40 and the synchronous motor 34. The control apparatus 50 further acquires a value detected by a temperature sensor 66 to detect a temperature Tm of the synchronous motor 34, and a value detected by a temperature sensor 68 to detect a temperature Ti of the inverter 40.

Figure 2:
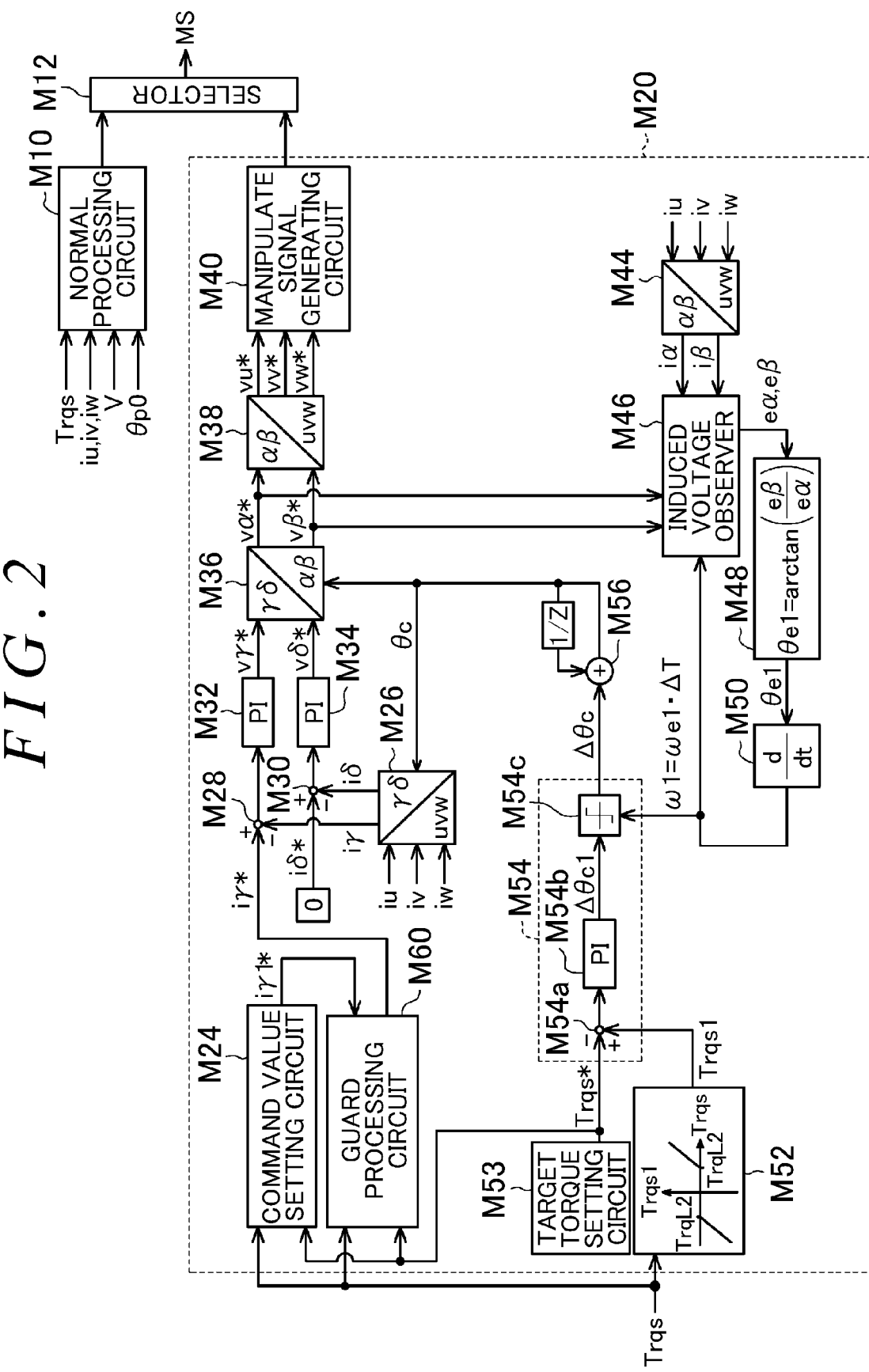
FIG. 2 is a block diagram illustrating some of the processes to be carried out by a CPU in the first embodiment.

FIG. 2 illustrates some of the processes to be carried out by the control apparatus 50. Specifically, FIG. 2 illustrates, on a process-by-process basis, some of the processes to be carried out when the CPU 52 executes program(s) stored in the memory 54.

A normal processing circuit M10 generates a manipulate signal MS and outputs the manipulate signal MS to the inverter 40 so as to control an assist torque generated by the synchronous motor 34. During this process, the normal processing circuit M10 receives: the rotation angle θp0 of the rotation shaft 34a detected by the rotation angle sensor 58; the currents iu, iv, and iw detected by the current sensor 64; the vehicle speed V detected by the vehicle speed sensor 62; and the steering torque Trqs detected by the torque sensor 60.

In the event of an abnormal condition in the rotation angle sensor 58, a sensorless processing circuit M20 controls the assist torque generated by the synchronous motor 34 without using the rotation angle θp0 detected by the rotation angle sensor 58.

In accordance with whether the rotation angle sensor 58 is operating abnormally, a selector M12 selects either the manipulate signal MS generated by the normal processing circuit M10 or the manipulate signal MS generated by the sensorless processing circuit M20, and outputs the manipulate signal MS selected to the inverter 40. In reality, the sensorless processing circuit M20 does not calculate the manipulate signal MS before the rotation angle sensor 58 develops an abnormal condition, and the normal processing circuit M10 does not calculate the manipulate signal MS after the rotation angle sensor 58 has developed an abnormal condition. In one example, the selector M12 may determine that an abnormal condition has occurred in the rotation angle sensor 58 when, although the absolute value of the steering torque Trqs is equal to or greater than a predetermined value, the value output from the rotation angle sensor 58 is constant for a predetermined period of time or longer.

The sensorless processing circuit M20 will be described below in more detail. In this embodiment, a γδ coordinate system is a rotary coordinate system and includes a γ axis and a δ axis. A command value setting circuit M24 variably sets a current command value iγ1* for the γ axis. In this embodiment, the current command value iγ1* for the γ axis is variably set by the command value setting circuit M24, and a current command value iδ* for the δ axis is kept at zero at all times.

A γδ converting circuit M26 converts the currents iu, iv, and iw for a three-phase fixed coordinate system into a current iγ for the γ axis of the γδ coordinate system and a current iδ for the δ axis of the γδ coordinate system. As already mentioned, the γδ coordinate system is a rotary coordinate system. In this embodiment, the rotation angle used when the γδ converting circuit M26 performs the coordinate conversion is a phase-control angle θc that will be described below.

A difference calculating circuit M28 subtracts the current iγ from a current command value iγ* and outputs the resulting value to a current feedback circuit M32. The current command value iγ* is obtained by performing a guard process on the γ axis current command value iγ1* by a guard processing circuit M60 that will be described below. A difference calculating circuit M30 subtracts the current iδ from the δ axis current command value iδ* and outputs the resulting value to a current feedback circuit M34. The current feedback circuit M32 receives the value output from the difference calculating circuit M28 and outputs a command voltage vγ* on the γ axis to an αβ converting circuit M36. The command voltage vγ* is a manipulated variable used to perform feedback control such that the γ axis current iγ corresponds to the current command value iγ*. The current feedback circuit M34 receives the value output from the difference calculating circuit M30 and outputs a command voltage vδ* on the δ axis to the αβ converting circuit M36. The command voltage vδ* is a manipulated variable used to perform feedback control such that the δ axis current iδ corresponds to the current command value iδ*. The current feedback circuit M32 is preferably configured to output a manipulated variable that is the sum of output values from proportional and integral elements that receive the value output from the difference calculating circuit M28. The current feedback circuit M34 is preferably configured to output a manipulated variable that is the sum of output values from proportional and integral elements that receive the value output from the difference calculating circuit M30.

The αβ converting circuit M36 converts the command voltage vγ* on the γ axis into a command voltage vα* on an α axis and outputs the command voltage vα* to a uvw converting circuit M38. The αβ converting circuit M36 converts the command voltage vδ* on the δ axis into a command voltage vβ* on β axis and outputs the command voltage vβ* to the uvw converting circuit M38. The predetermined rotation angle used when the αβ converting circuit M36 performs the coordinate conversion is the phase-control angle θc that will be described below. The uvw converting circuit M38 converts the command voltage vα* on the α axis and the command voltage vβ* on the β axis into command voltages vu*, vv*, and vw* for the three-phase fixed coordinate system, and outputs the command voltages vu*, vv*, and vw* to a manipulate signal generating circuit M40. The manipulate signal generating circuit M40 generates the manipulate signal MS and outputs the manipulate signal MS to the inverter 40 such that an inter-output line voltage of the inverter 40 becomes a phase-to-phase voltage determined in accordance with the command voltages vu*, vv*, and vw*.

An αβ converting circuit M44 converts the currents iu, iv, and iw into currents iα and iβ for an αβ coordinate system. An induced voltage observer M46 estimates an induced voltage eα on the α axis and an induced voltage eβ on the β axis on the basis of: the currents iα and iβ output from the αβ converting circuit M44; the command voltages vα* and vβ* output from the αβ converting circuit M36; and an estimated variation ω1 that will be described below. An angle calculating circuit M48 determines a ratio between the estimated induced voltages eα and eβ so as to calculate an estimated angle θe1 using an arctangent function of the ratio eβ/eα, and outputs the estimated angle θe1 to a speed calculating circuit M50. The speed calculating circuit M50 receives the estimated angle θe1 so as to calculate the estimated variation ω1. The estimated variation ω1 indicates a variation in the estimated angle θe1 per predetermined time ΔT. Using a variation rate ωe1 of the estimated angle θe1, the estimated variation ω1 is represented as ωe1·ΔT.

A dead band processing circuit M52 calculates a steering torque Trqs1. When the magnitude of the steering torque Trqs detected by the torque sensor 60 is equal to or smaller than a predetermined value TrqL2, the steering torque Trqs1 is zero. When the magnitude of the steering torque Trqs is greater than the predetermined value TrqL2, the steering torque Trqs1 is reduced by the predetermined value TrqL2.

A target torque setting circuit M53 sets a target torque Trqs*. In this embodiment, the target torque Trqs* is assumed to be zero. An update amount calculating circuit M54 calculates a phase-control angle update amount Δθc for the predetermined time ΔT, with the aim of manipulating the phase-control angle θc so as to perform feedback control such that the steering torque Trqs1 corresponds to the target torque Trqs*. The update amount calculating circuit M54 outputs the update amount Δθc to an update processing circuit M56. In this embodiment, the current flowing through the synchronous motor 34 is assumed to be controlled so as to be between the positive sides of d and q axes of a rotary coordinate system. In other words, the phase of the current is assumed to be controlled so as to be within the range of zero to −90 degrees. As used herein, the term "positive direction of the d axis" refers to the direction of a magnetic pole, and the term "positive direction of the q axis" refers to a direction rotated by 90 degrees in the direction of rotation of the synchronous motor 34 with respect to the d axis in terms of electrical angle. The phase of the current is defined as being positive when the phase of the current is an angle that the direction of a current phasor (i.e., the positive direction of the γ axis in this embodiment) forms with the q axis, and the phase of the current extends from the q axis in the direction of rotation.

Suppose that the current flowing through the synchronous motor 34 is controlled in the above-described manner. In this case, when the update amount Δθc of the phase-control angle θc is equal to the actual amount of rotation of the synchronous motor 34 per predetermined time ΔT, the phase of the current is constant. When the update amount Δθc is greater than the actual amount of rotation of the synchronous motor 34 per predetermined time ΔT, the phase of the current changes so as to cause the current phasor to advance. When the update amount Δθc is smaller than the actual amount of rotation of the synchronous motor 34 per predetermined time ΔT, the phase of the current changes so as to cause the current phasor to lag. Thus, assuming that the phase-control angle θc is a parameter to determine the phase of the current, this embodiment involves manipulating the phase-control angle θc so as to manipulate the phase of the current.

Specifically, a difference calculating circuit M54a subtracts the target torque Trqs* from the steering torque Trqs1 and outputs the resulting value to a feedback processing circuit M54b. On the basis of the value output from the difference calculating circuit M54a, the feedback processing circuit M54b calculates an update amount Δθc1 and outputs the update amount Δθc1 to an estimated value base guard processing circuit M54c. The update amount Δθc1 is a manipulated variable used to perform feedback control such that the steering torque Trqs1 corresponds to the target torque Trqs*. More specifically, the update amount Δθc1 is the sum of output values from proportional and integral elements that receive the value output from the difference calculating circuit M54a.

The estimated value base guard processing circuit M54c performs a guard process on the update amount Δθc1 on the basis of the estimated variation ω1. This means that the synchronous motor 34 rotates by the estimated variation ω1 during lapse of the predetermined time ΔT. Suppose that the steering torque Trqs1 is greater than the target torque Trqs*. In this case, in order to increase the torque generated by the synchronous motor 34, the update amount Δθc1 should be of the same sign as the estimated variation ω1 and greater in magnitude (or absolute value) than the estimated variation ω1. To this end, the estimated value base guard processing circuit M54c performs a guard process on the update amount Δθc1 using an estimated value base lower limit guard value greater in magnitude than the estimated variation ω1 by a predetermined value, and outputs the resulting update amount Δθc to the update processing circuit M56. Suppose that the steering torque Trqs1 is equal to the target torque Trqs*. In this case, in order to maintain this state, the update amount Δθc should be equal to the estimated variation ω1. To this end, the estimated value base guard processing circuit M54c performs a guard process on the update amount Δθc1 using an estimated value base upper limit guard value and an estimated value base lower limit guard value equal to the estimated variation ω1, and outputs the resulting update amount Δθc to the update processing circuit M56.

The update processing circuit M56 adds the present update amount Δθc to the phase-control angle θc for the preceding control period so as to update the phase-control angle θc. The predetermined time ΔT corresponds to the control period.

Figure 3:
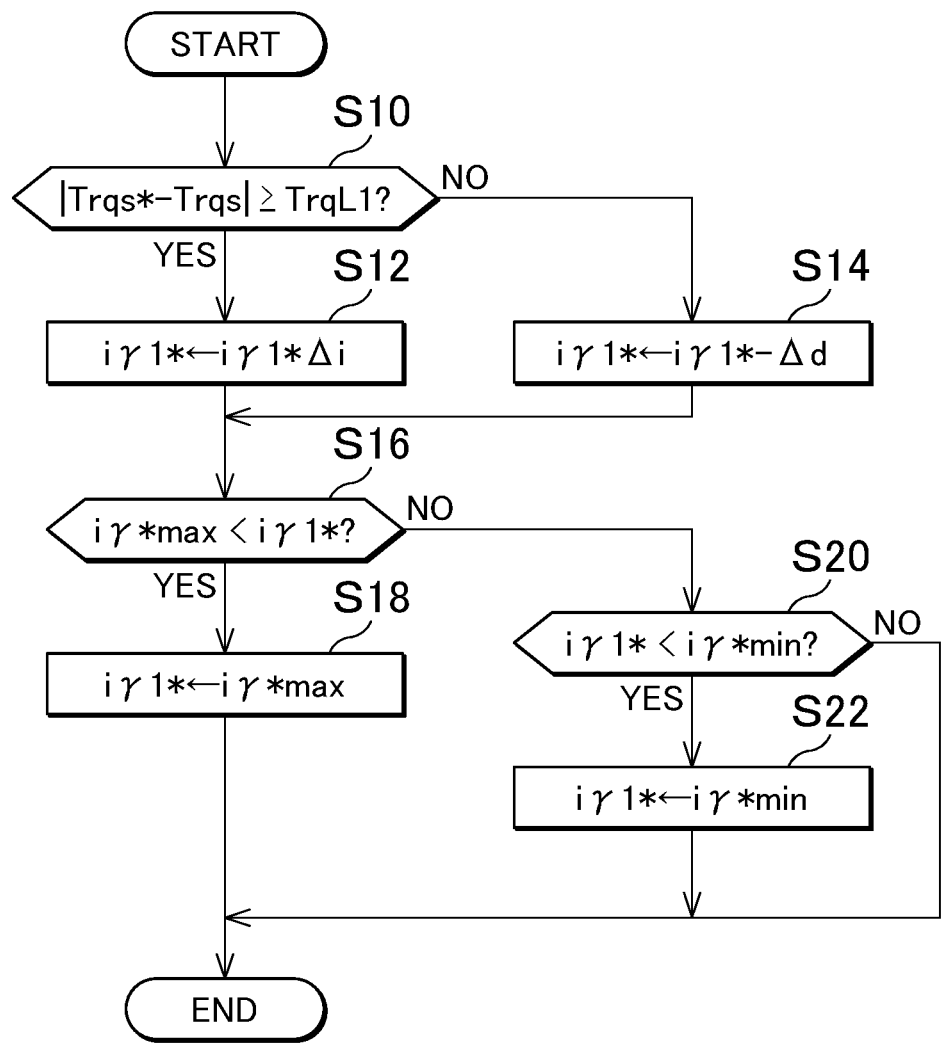
FIG. 3 is a flow chart illustrating process steps to be performed by a command value setting circuit according to the first embodiment.

Process steps to be performed by the command value setting circuit M24 will be described below. FIG. 3 illustrates the process steps to be performed by the command value setting circuit M24 according to this embodiment. The process steps illustrated in FIG. 3 are repeated at predetermined intervals, for example. The following description is based on the assumption that the CPU 52 performs the process steps described below. Although the sign of the γ axis current command value iγ1* output from the command value setting circuit M24 is zero or greater than zero irrespective of the direction of rotation of the synchronous motor 34 in the following description, this embodiment may actually use logic that inverts the sign in accordance with the direction of rotation.

To perform a sequence of the process steps illustrated in FIG. 3, the CPU 52 first determines, in step S10, whether the absolute value of a difference between the steering torque Trqs and the target torque Trqs* is equal to or greater than a specified value TrqL1. This process step aims to determine whether an amount by which the steering torque Trqs detected by the torque sensor 60 exceeds in magnitude the target torque Trqs* is equal to or greater than the specified value TrqL1. The amount by which the steering torque Trqs exceeds in magnitude the target torque Trqs* may simply be referred to as an "exceeding amount". In this embodiment, the specified value TrqL1 is set below the predetermined value TrqL2.

Suppose that the exceeding amount is determined to be equal to or greater than the specified value TrqL1 (S10: YES). In this case, the assist torque has to be controlled by manipulating the phase of the current flowing through the synchronous motor 34. Accordingly, in step S12, the CPU 52 adds an increase correction amount Δi to the γ axis current command value iγ1* so as to increase the current command value iγ1*. Because the specified value TrqL1 is smaller than the predetermined value TrqL2, performing step S12 enables the current command value iγ1* to be greater than zero when the value output from the difference calculating circuit M54a is zero. Thus, when the absolute value of the output value from the difference calculating circuit M54a is greater than zero, the absolute value of the current command value iγ1* is allowed to be greater than zero. Consequently, preparations are made for torque feedback control to be carried out using the phase-control angle θc as a manipulated variable.

Suppose that the exceeding amount is determined to be below the specified value TrqL1 (S10: NO). In this case, the assist torque does not necessarily have to be controlled by manipulating the phase of the current flowing through the synchronous motor 34. Accordingly, in step S14, the CPU 52 subtracts a reduction correction amount Δd from the γ axis current command value iγ1* so as to reduce the current command value iγ1*. In this embodiment, the reduction correction amount Δd is smaller than the increase correction amount Δi.

Following the completion of step S12 or S14, the CPU 52 determines, in step S16, whether the current command value iγ1* is greater than an upper limit iγ*max. The upper limit iγ*max is an upper limit allowable as a command value for the γ axis current iγ for the synchronous motor 34. Upon determining that the current command value iγ1* is greater than the upper limit iγ*max (S16: YES), the CPU 52 sets the upper limit iγ*max to be the current command value iγ1* in step S18.

Upon determining that the current command value iγ1* is equal to or smaller than the upper limit iγ*max (S16: NO), the CPU 52 determines, in step S20, whether the current command value iγ1* is smaller than a lower limit iγ*min. In this embodiment, the lower limit iγ*min is zero. Upon determining that the current command value iγ1* is smaller than the lower limit iγ*min (S20: YES), the CPU 52 sets the lower limit iγ*min to be the current command value iγ1* in step S22.

Following the completion of step S18 or S22 or the determination in step S20 that the current command value iγ1* is not smaller than the lower limit iγ*min, the CPU 52 temporarily ends the sequence of process steps illustrated in FIG. 3. The increase correction amount Δi is set below the upper limit iγ*max. Thus, as a result of performing the process steps illustrated in FIG. 3, the current command value iγ1* gradually increases from zero when the amount by which the steering torque Trqs exceeds in magnitude the target torque Trqs* is equal to or greater than the specified value TrqL1. The current command value iγ1* gradually decreases to zero when the exceeding amount is below the specified value TrqL1.

Figure 4:
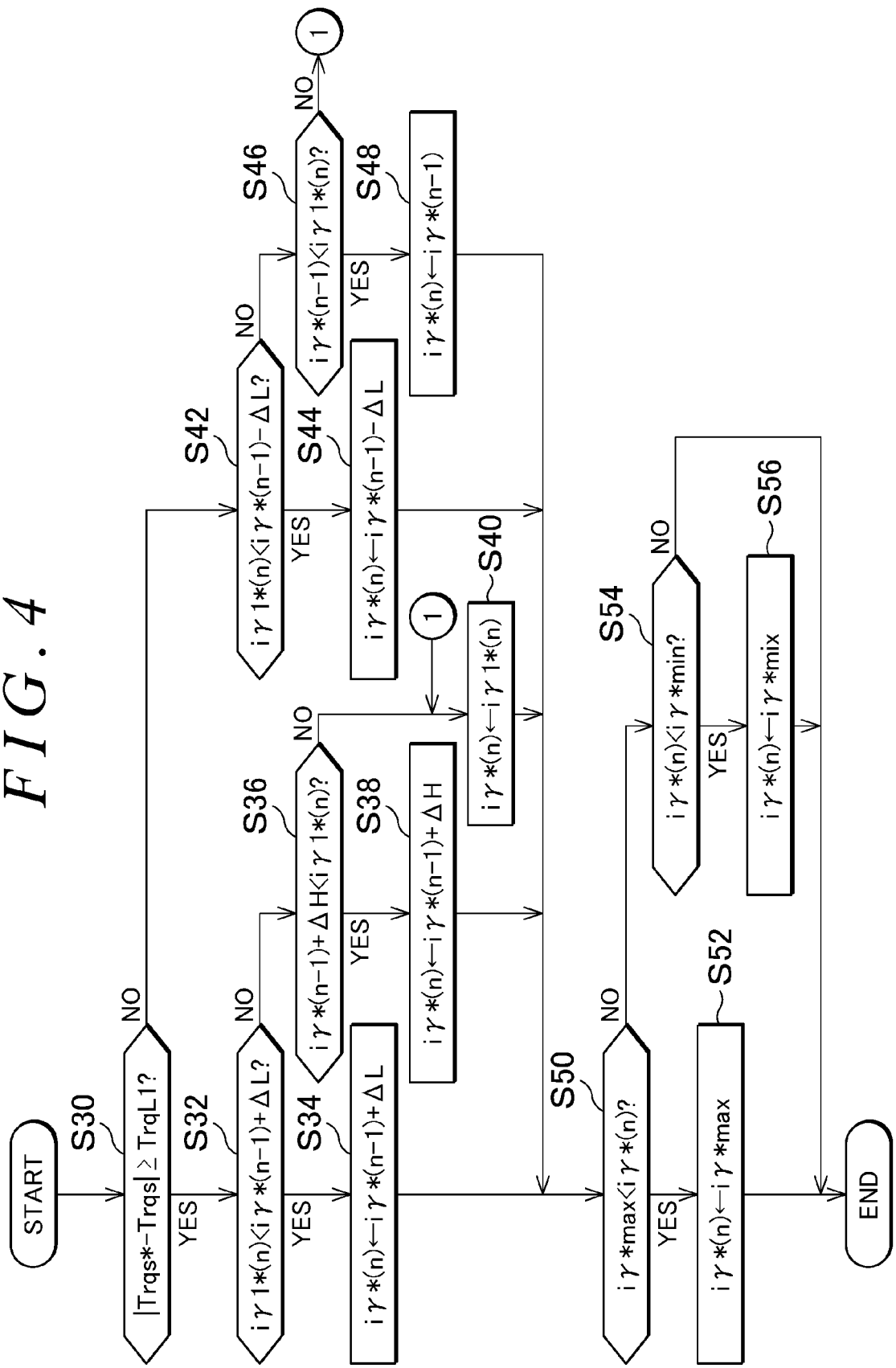
FIG. 4 is a flow chart illustrating process steps to be performed by a guard processing circuit according to the first embodiment.

Process steps to be performed by the guard processing circuit M60 will be described below. FIG. 4 illustrates the process steps to be performed by the guard processing circuit M60 according to this embodiment. The process steps illustrated in FIG. 4 are repeated at predetermined intervals, for example. The following description is based on the assumption that the CPU 52 performs the process steps illustrated in FIG. 4.

To perform a sequence of the process steps illustrated in FIG. 4, the CPU 52 first determines, in step S30, whether the absolute value of a difference between the steering torque Trqs and the target torque Trqs* is equal to or greater than the specified value TrqL1. This process step aims to determine whether the amount by which the steering torque Trqs detected by the torque sensor 60 exceeds in magnitude the target torque Trqs* is equal to or greater than the specified value TrqL1. Upon determining that the exceeding amount is equal to or greater than the specified value TrqL1 (S30: YES), the CPU 52 determines, in step S32, whether the present value iγ1*(n) of the current command value iγ1* output from the command value setting circuit M24 is smaller than a value obtained by adding a specified amount ΔL to the preceding value iγ*(n−1) of the current command value iγ*. The value obtained by this addition may hereinafter be referred to as a "first addition result". In this embodiment, the specified amount ΔL is set to be below the increase correction amount Δi but equal to or greater than the reduction correction amount Δd. Upon determining that the present value iγ1*(n) is smaller than the first addition result (S32: YES), the CPU 52 adds, in step S34, the specified amount ΔL to the preceding value iγ*(n−1) of the current command value iγ* so as to provide the present value iγ*(n) of the current command value iγ*. This process step aims to prevent an excessive reduction in the magnitude of the current command value iγ* in view of the fact that when the exceeding amount is determined to be equal to or greater than the specified value TrqL1 in step S30, the assist torque needs to be controlled by manipulating the phase of the current flowing through the synchronous motor 34.

Suppose that the present value iγ1*(n) is determined to be equal to or greater than the first addition result (S32: NO). In this case, the CPU 52 determines, in step S36, whether the present value iγ1*(n) is greater than a value obtained by adding a predetermined amount ΔH greater than the specified amount ΔL to the preceding value iγ*(n−1) of the current command value iγ*. The value obtained by this addition may hereinafter be referred to as a "second addition result". The predetermined amount ΔH is set to be greater than the increase correction amount Δi. Upon determining that the present value iγ1*(n) is greater than the second addition result (S36: YES), the CPU 52 sets the second addition result to be the present value iγ*(n) of the current command value iγ* in step S38.

Suppose that the present value iγ1*(n) is determined to be equal to or smaller than the second addition result (S36: NO). In this case, the CPU 52 determines that the variation in the present value iγ1*(n) with respect to the preceding value iγ*(n−1) falls within an allowable range. Thus, the CPU 52 sets the present value iγ1*(n) set by the command value setting circuit M24 to be the present value iγ*(n) in step S40.

Suppose that the exceeding amount is determined to be below the specified value TrqL1 (S30: NO). In this case, the CPU 52 determines, in step S42, whether the present value iγ1*(n) of the current command value iγ1* output from the command value setting circuit M24 is smaller than a value obtained by subtracting the specified amount ΔL from the preceding value iγ*(n−1) of the current command value iγ*. The value obtained by this subtraction may hereinafter be referred to as a "first subtraction result". Upon determining that the present value iγ1*(n) is smaller than the first subtraction result (S42: YES), the CPU 52 sets the first subtraction result to be the present value iγ*(n) of the current command value iγ* in step S44. This process step is performed in view of the fact that when the current command value iγ1* output from the command value setting circuit M24 is normal, the present value iγ1*(n) is equal to or greater than the first subtraction result.

Upon determining that the present value iγ1*(n) is equal to or greater than the first subtraction result (S42: NO), the CPU 52 determines, in step S46, whether the present value iγ1*(n) is greater than the preceding value iγ*(n−1). Upon determining that the present value iγ1*(n) is greater than the preceding value iγ*(n−1) (S46: YES), the CPU 52 sets the preceding value iγ*(n−1) to be the present value iγ*(n) in step S48.

Suppose that the present value iγ1*(n) is determined to be equal to or smaller than the preceding value iγ*(n−1) (S46: NO). In this case, the CPU 52 determines that the variation in the present value iγ1*(n) output from the command value setting circuit M24 with respect to the preceding value iγ*(n−1) falls within an allowable range. Thus, the CPU 52 sets the present value iγ1*(n) to be the present value iγ*(n) in step S40.

Following the completion of step S34, S38, S40, S44, or S48, the CPU 52 determines, in step S50, whether the present value iγ*(n) of the current command value iγ* is greater than the upper limit iγ*max. Upon determining that the present value iγ*(n) of the current command value iγ* is greater than the upper limit iγ*max (S50: YES), the CPU 52 sets the upper limit iγ*max to be the present value iγ*(n) in step S52.

Upon determining that the present value iγ*(n) is equal to or smaller than the upper limit iγ*max (S50: NO), the CPU 52 determines, in step S54, whether the present value iγ*(n) is smaller than the lower limit iγ*min. Upon determining that the present value iγ*(n) is smaller than the lower limit iγ*min (S54: YES), the CPU 52 sets the lower limit iγ*min to be the present value iγ*(n) in step S56.

Following the completion of step S52 or S56 or the determination in step S54 that the present value iγ*(n) is not smaller than the lower limit iγ*min, the CPU 52 temporarily ends the sequence of process steps illustrated in FIG. 4.

The following description discusses how this embodiment functions. Suppose that the amount by which the steering torque Trqs exceeds the target torque Trqs* is equal to or greater than the specified value TrqL1. In this case, the CPU 52 causes the guard processing circuit M60 to perform a guard process on the current command value iγ1* output from the command value setting circuit M24, so that the current command value iγ* is greater in magnitude than the preceding value iγ*(n−1). Accordingly, this embodiment prevents the current command value iγ* to be input to the difference calculating circuit M28 from being excessively reduced in a situation where the command value setting circuit M24 is in an abnormal condition and the current command value iγ1* output from the command value setting circuit M24 decreases although the exceeding amount is equal to or greater than the specified value TrqL1. Consequently, the feedback processing circuit M54b manipulates the phase-control angle θc so as to adjust the steering torque Trqs1 to the target torque Trqs*, thus adjusting the assist torque generated by the synchronous motor 34 to a suitable value.

The logic of the process steps performed by the guard processing circuit M60 differs from the logic of the process steps performed by the command value setting circuit M24. Thus, if a systematic error, such as an error in logic or constant, occurs in the command value setting circuit M24, this embodiment would prevent or reduce degradation in the reliability of the guard processing circuit M60. Suppose that process steps identical to those performed by the command value setting circuit M24 are carried out twice in parallel, for example, and values obtained in the course of the process steps are compared with each other so as to cope with a systematic error in the command value setting circuit M24. In such a case, the process steps are carried out twice in parallel using the same logic. This unfortunately reduces the reliability of the current command value iγ* in the event of occurrence of a systematic error.

The above-described embodiment achieves effects described below.

Steps S30 to S48 are performed to carry out a variation guard process based on whether the variation in the current command value iγ* from the previous value falls within an allowable range. Thus, there is no guarantee that the absolute value of the current command value iγ* subjected to the variation guard process is a suitable value. To solve this problem, this embodiment involves performing steps S50 to S54 so as to carry out a guard process on the current command value iγ* subjected to the variation guard process, so that the current command value iγ* is between the upper limit iγ*max and the lower limit iγ*min inclusive. Consequently, the absolute value of the current command value iγ* output from the guard processing circuit M60 will be a suitable value.

A steering control apparatus according to a second embodiment of the invention will be described below with reference to the drawings. The following description focuses on differences between the first embodiment and the second embodiment.

Figure 5:
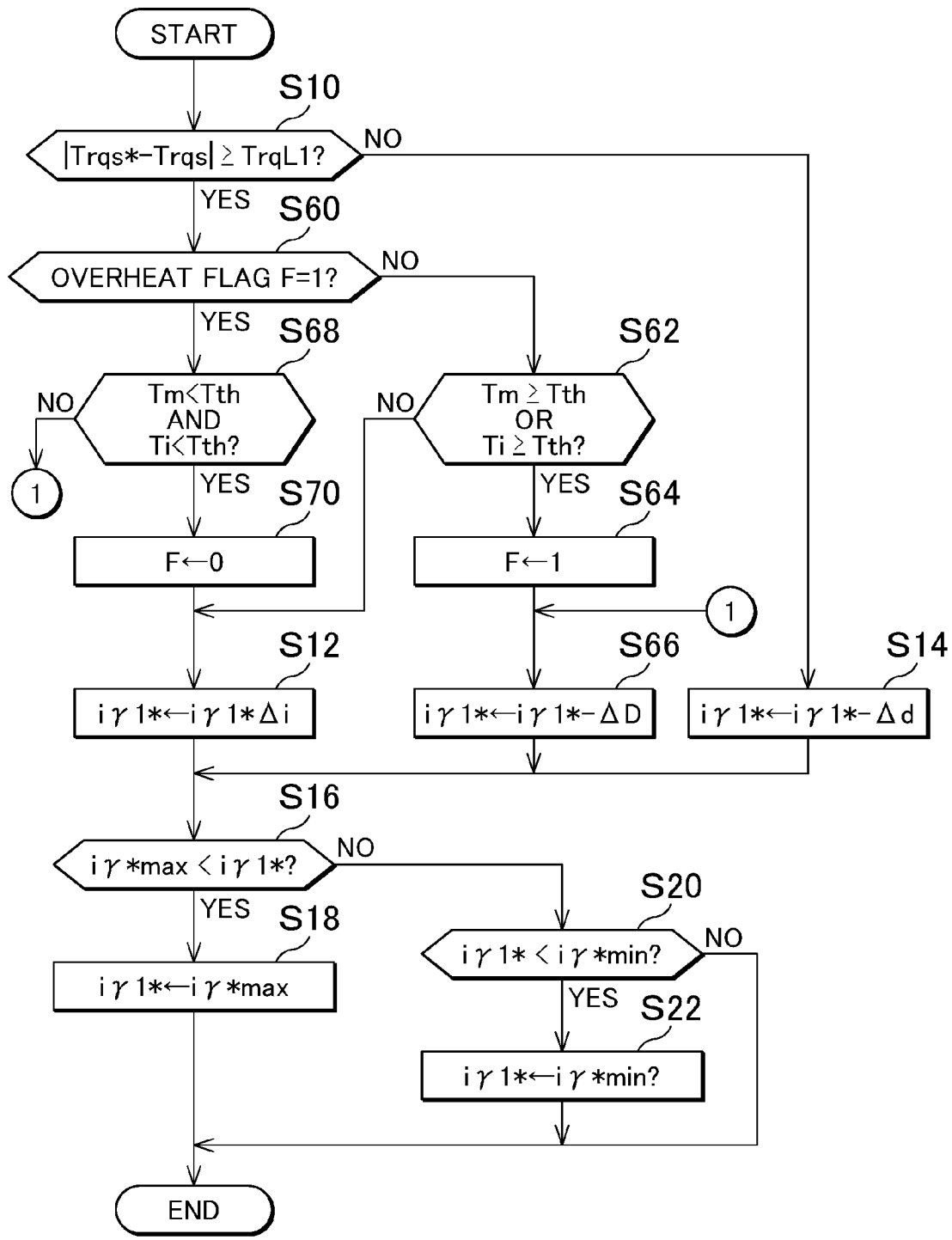
FIG. 5 is a flow chart illustrating process steps to be performed by a command value setting circuit according to a second embodiment of the invention.

FIG. 5 illustrates process steps to be performed by the command value setting circuit M24 according to the second embodiment. The process steps illustrated in FIG. 5 are repeated at predetermined intervals, for example. In FIG. 5, the process steps corresponding to those illustrated in FIG. 3 are identified by the same reference signs for the sake of convenience, and description thereof will be omitted.

To perform a sequence of the process steps illustrated in FIG. 5, the CPU 52 first determines, in step S10, whether the exceeding amount is equal to or greater than the specified value TrqL1. Upon determining that the exceeding amount is equal to or greater than the specified value TrqL1 (S10: YES), the CPU 52 determines, in step S60, whether an overheat flag F is 1. The overheat flag F is set to 1 when the temperature Tm of the synchronous motor 34 is excessively high or the temperature Ti of the inverter 40 is excessively high. The overheat flag F is set to 0 in other cases. Upon determining that the overheat flag F is 0 (S60: NO), the CPU 52 determines, in step S62, whether the logical sum of the fact that the temperature Tm of the synchronous motor 34 is equal to or higher than a specified temperature Tth and the fact that the temperature Ti of the inverter 40 is equal to or higher than the specified temperature Tth is true. Upon determining that the logical sum is true (S62: YES), the CPU 52 sets the overheat flag F to 1 in step S64. In step S66, the CPU 52 subtracts an overheat reduction correction amount ΔD from the current command value iγ1* so as to reduce the magnitude of the current command value iγ1*. The procedure then goes to step S16.

Upon determining that the overheat flag F is 1 (S60: YES), the CPU 52 determines, in step S68, whether the logical product of the fact that the temperature Tm is lower than the specified temperature Tth and the fact that the temperature Ti is lower than the specified temperature Tth is true. Upon determining that the logical product is true (S68: YES), the CPU 52 sets the overheat flag F to 0 in step S70. The procedure then goes to step S12. When the CPU 52 determines that the logical product is false (S68: NO), the procedure goes to step S66.

As described above, assuming that the overheat flag F is 1, this embodiment will reduce, if the exceeding amount (i.e., the amount by which the steering torque Trqs exceeds in magnitude the target torque Trqs*) is equal to or greater than the specified value TrqL1, the absolute value of the current command value iγ1* with the aim of preventing the temperature of the synchronous motor 34 and/or the temperature of the inverter 40 from being excessively increased. When the guard processing circuit M60 carries out the process steps illustrated in FIG. 4, however, the final current command value iγ* cannot be reduced. To solve this problem, the second embodiment involves varying the guard process as described below.

Figure 6:
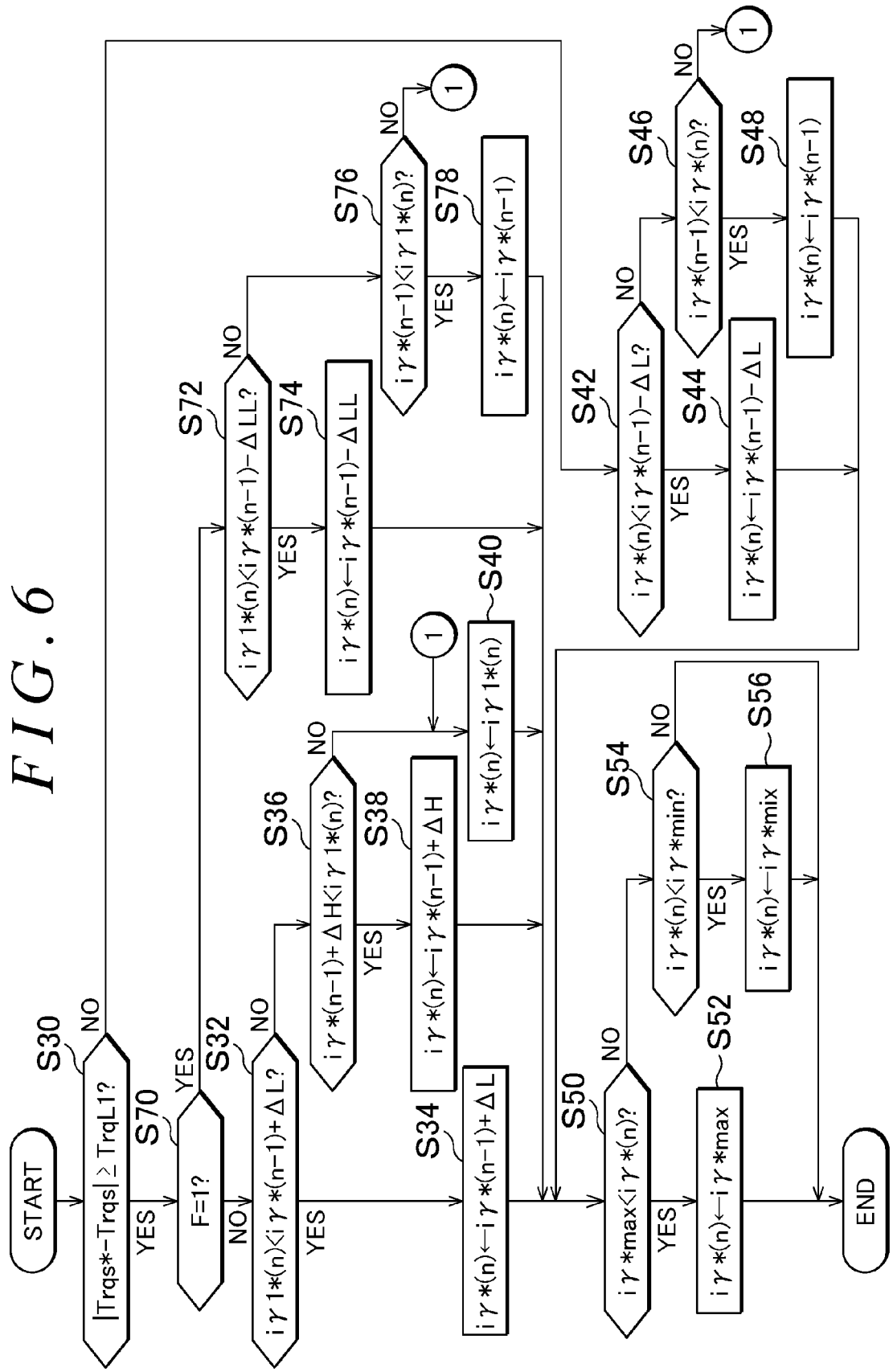
FIG. 6 is a flow chart illustrating process steps to be performed by a guard processing circuit according to the second embodiment.

FIG. 6 illustrates process steps to be performed by the guard processing circuit M60 according to the second embodiment. The process steps illustrated in FIG. 6 are repeated at predetermined intervals, for example. In FIG. 6, the process steps corresponding to those illustrated in FIG. 4 are identified by the same reference signs for the sake of convenience.

To perform a sequence of the process steps illustrated in FIG. 6, the CPU 52 first determines, in step S30, whether the exceeding amount (i.e., the amount by which the steering torque Trqs exceeds in magnitude the target torque Trqs*) is equal to or greater than the specified value TrqL1. Upon determining that the exceeding amount is equal to or greater than the specified value TrqL1 (S30: YES), the CPU 52 determines, in step S70, whether the overheat flag F is 1. When the CPU 52 determines that the overheat flag F is not 1 (S70: NO), the procedure goes to step S32. When the CPU 52 determines that the overheat flag F is 1 (S70: YES), the CPU 52 determines, in step S72, whether the present value iγ1*(n) of the current command value iγ1* is smaller than a value obtained by subtracting an overheat specified amount ΔLL from the preceding value iγ*(n−1) of the current command value iγ*. The value obtained by this subtraction may hereinafter be referred to as a "second subtraction result". Upon determining that the present value iγ1*(n) of the current command value iγ1* is smaller than the second subtraction result (S72: YES), the CPU 52 sets the second subtraction result to be the present value iγ*(n) of the current command value iγ* in step S74.

Upon determining that the present value iγ1*(n) is equal to or greater than the second subtraction result (S72: NO), the CPU 52 determines, in step S76, whether the present value iγ1*(n) is greater than the preceding value iγ*(n−1). When the CPU 52 determines that the present value iγ1*(n) is greater than the preceding value iγ*(n−1) (S76: YES), the CPU 52 sets the preceding value iγ*(n−1) to be the present value iγ*(n) in step S78. Following the determination that the present value iγ1*(n) is equal to or smaller than the preceding value iγ*(n−1) (S76: NO), the CPU 52 determines that the variation in the present value iγ1*(n) with respect to the preceding value iγ*(n−1) falls within an allowable range. The procedure then goes to step S40. Upon completion of step S74 or S78, the procedure goes to step S50.

As described above, assuming that the overheat flag F is 1, this embodiment would enable the guard processing circuit M60 to permit a reduction in the current command value iγ* if the exceeding amount (i.e., the amount by which the steering torque Trqs exceeds in magnitude the target torque Trqs*) is equal to or greater than the specified value TrqL1. Thus, this embodiment prevents the temperature of the synchronous motor 34 and/or the temperature of the inverter 40 from being excessively increased, although the steering control apparatus (i.e., the control apparatus 50) is provided with the guard processing circuit M60 configured to cope with a systematic error.

A steering control apparatus according to a third embodiment of the invention will be described below with reference to the drawings. The following description focuses on differences between the second embodiment and the third embodiment.

Assuming that the overheat flag F is 1, the second embodiment would enable the guard processing circuit M60 to perform the guard process so as to permit a reduction in the current command value iγ* if the exceeding amount (i.e., the amount by which the steering torque Trqs exceeds in magnitude the target torque Trqs*) is determined to be equal to or greater than the specified value TrqL1. The overheat flag F itself, however, is normal logic to enable the sensorless processing circuit M20 to perform its processes. An abnormality in this logic makes it impossible to cope with high temperature of the synchronous motor 34 or the inverter 40. An abnormality in the command value setting circuit M24 that results in failure to reduce the current command value iγ1* when the temperature of the synchronous motor 34 or the inverter 40 is high also makes it impossible to cope with the high temperature of the synchronous motor 34 or the inverter 40. To solve these problems, the third embodiment involves varying the process steps to be performed by the guard processing circuit M60 as described below.

Figure 7:
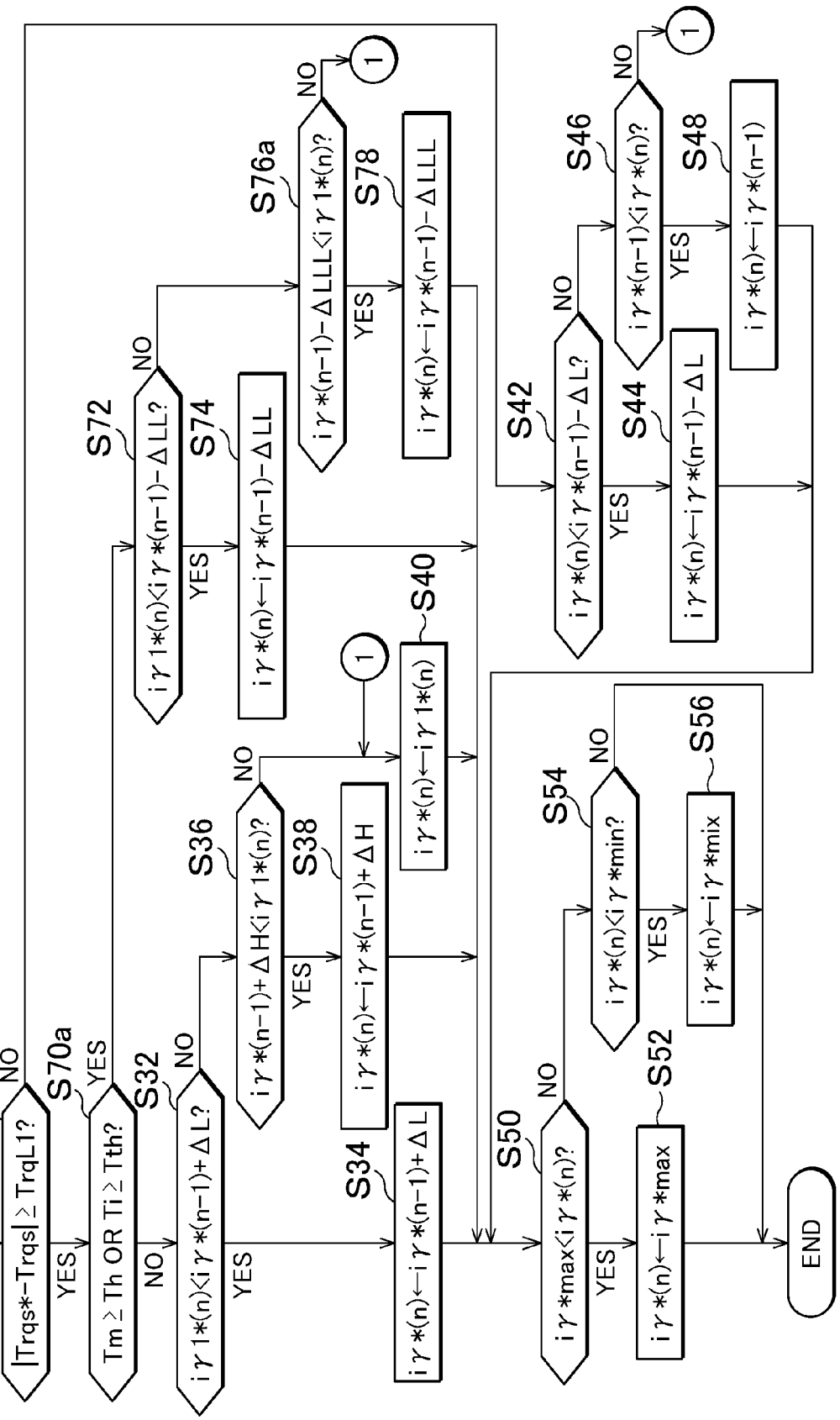
FIG. 7 is a flow chart illustrating process steps to be performed by a guard processing circuit according to a third embodiment of the invention.

FIG. 7 illustrates the process steps to be performed by the guard processing circuit M60 according to the third embodiment. The process steps illustrated in FIG. 7 are repeated at predetermined intervals, for example. In FIG. 7, the process steps corresponding to those illustrated in FIG. 6 are identified by the same reference signs for the sake of convenience.

To perform a sequence of the process steps illustrated in FIG. 7, the CPU 52 first determines, in step S30, whether the exceeding amount is equal to or greater than the specified value TrqL1. Upon determining that the exceeding amount is equal to or greater than the specified value TrqL1 (S30: YES), the CPU 52 determines, in step S70a, whether the logical sum of the fact that the temperature Tm of the synchronous motor 34 is equal to or higher than the specified temperature Tth and the fact that the temperature Ti of the inverter 40 is equal to or higher than the specified temperature Tth is true. When the CPU 52 determines that the logical sum is false (S70a: NO), the procedure goes to step S32. When the CPU 52 determines that the logical sum is true (S70a: YES), the CPU 52 determines, in step S72, whether the present value iγ1*(n) of the current command value iγ1* is smaller than the second subtraction result. Upon determining that the present value iγ1*(n) is equal to or greater than the second subtraction result (S72: NO), the CPU 52 determines, in step S76a, whether the present value iγ1*(n) is greater than a value obtained by subtracting an overheat reduction correction amount ΔLLL from the preceding value iγ*(n−1). The value obtained by this subtraction may hereinafter be referred to as a "third subtraction result". The overheat reduction correction amount ΔLLL is set below the overheat specified amount ΔLL.

Upon determining that the present value iγ1*(n) is greater than the third subtraction result (S76a: YES), the CPU 52 sets the third subtraction result to be the present value iγ*(n) of the current command value iγ* in step S78. The procedure then goes to step S50. When the CPU 52 determines that the present value iγ1*(n) is not greater than the third subtraction result (S76a: NO), the procedure goes to step S40.

As described above, the guard processing circuit M60 according to this embodiment determines, independently of the command value setting circuit M24, whether the logical sum of the fact that the temperature Tm of the synchronous motor 34 is equal to or higher than the specified temperature Tth and the fact that the temperature Ti of the inverter 40 is equal to or higher than the specified temperature Tth is true. When the logical sum is true, the guard processing circuit M60 reduces the current command value iγ*. Thus, this embodiment makes it possible to reliably cope with high temperature of the synchronous motor 34 or the inverter 40.

A steering control apparatus according to a fourth embodiment of the invention will be described below with reference to the drawings. The following description focuses on differences between the first embodiment and the fourth embodiment.

Figure 8:
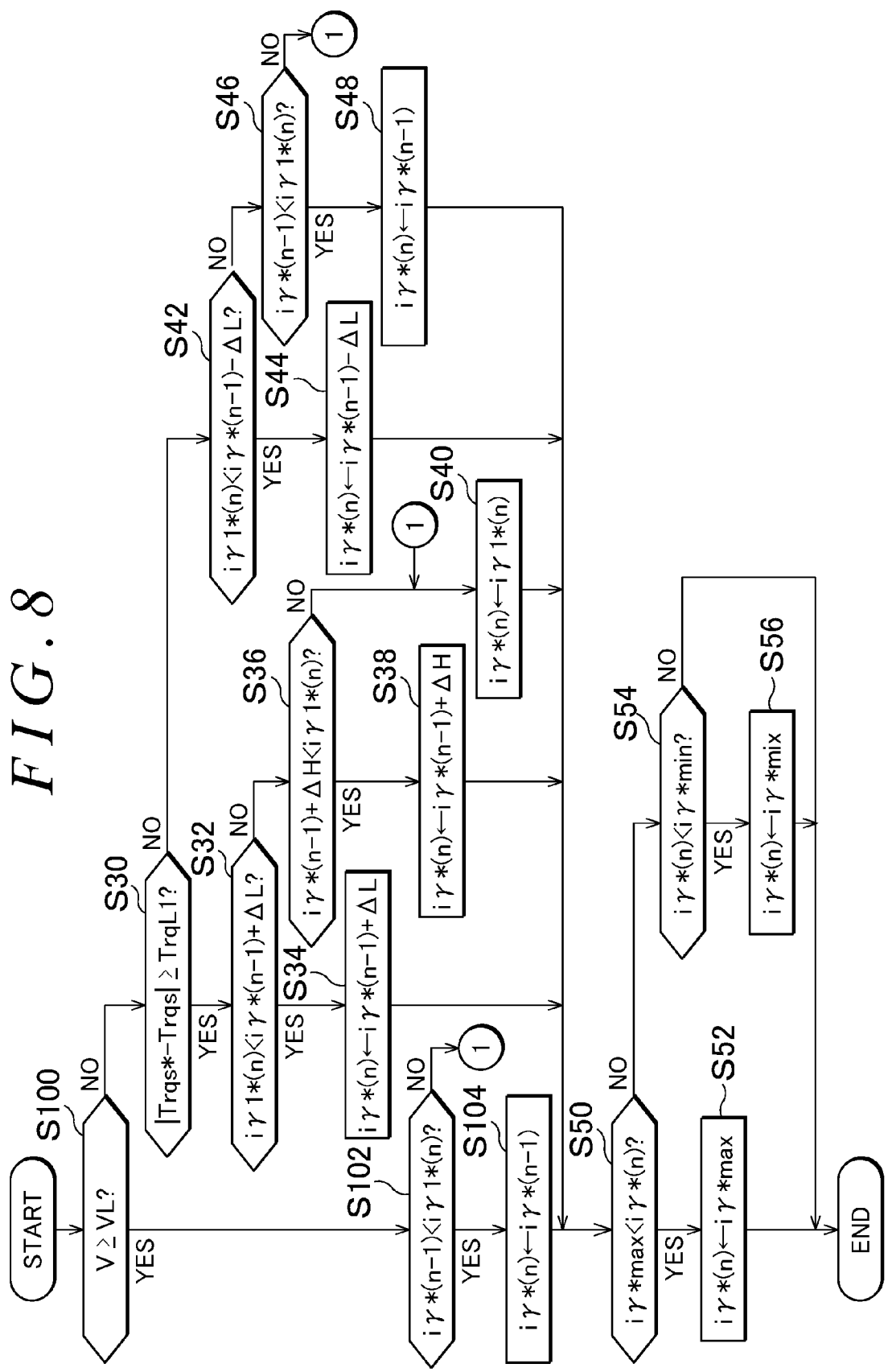
FIG. 8 is a flow chart illustrating process steps to be performed by a guard processing circuit according to a fourth embodiment of the invention.

FIG. 8 illustrates process steps to be performed by the guard processing circuit M60 according to the fourth embodiment. The process steps illustrated in FIG. 8 are repeated at predetermined intervals, for example. In FIG. 8, the process steps corresponding to those illustrated in FIG. 4 are identified by the same reference signs for the sake of convenience, and description thereof will be omitted.

To perform a sequence of the process steps illustrated in FIG. 8, the CPU 52 performs the process steps described below before performing a variation guard process (i.e., steps S30 to S48) and an absolute value guard process (i.e., steps S50 to S56).

The CPU 52 first determines, in step S100, whether the vehicle speed V is equal to or higher than a vehicle speed threshold value VL. This process step is performed to determine which of the following states the vehicle is in: a high vehicle speed state where the vehicle is traveling at a high speed; and a low vehicle speed state where the vehicle is traveling at a low speed. To determine which of the high and low vehicle speed states the vehicle is in, the vehicle speed threshold value VL is set between a predetermined high vehicle speed and a predetermined low vehicle speed. Upon determining that the vehicle speed V is equal to or higher than the vehicle speed threshold value VL (S100: YES), the CPU 52 determines, in step S102, whether the preceding value iγ*(n−1) of the current command value iγ* is smaller than the present value iγ1*(n) of the current command value iγ1* output from the command value setting circuit M24. When the CPU 52 determines that the preceding value iγ*(n−1) is smaller than the present value iγ1*(n) (S102: YES), the CPU 52 sets the preceding value iγ*(n−1) of the current command value iγ* to be the present value iγ*(n) of the current command value iγ* in step S104. This process step aims to prevent an excessive increase in the current command value iγ* in view of the fact that no large assist torque is necessary when the vehicle speed V is determined to be equal to or higher than the vehicle speed threshold value VL in step S100 (i.e., when the vehicle is traveling at a high speed). The CPU 52 then performs the absolute value guard process (i.e., steps S50 to S56).

Upon determining that the preceding value iγ*(n−1) is not smaller than the present value iγ1*(n) (S102: NO), the CPU 52 determines that the variation in the present value iγ1*(n) output from the command value setting circuit M24 with respect to the preceding value iγ*(n−1) falls within an allowable range. Thus, the CPU 52 sets the present value iγ1*(n) to be the present value iγ*(n) in step S40. In other words, this embodiment permits only a reduction in the current command value iγ* in the high vehicle speed state, so that no excessive assistance is provided in the high vehicle speed state.

Following the determination that the vehicle speed V is lower than the vehicle speed threshold value VL (S100: NO), the CPU 52 performs the variation guard process (i.e., steps S30 to S48) and the absolute value guard process (i.e., steps S50 to S56).

As described above, the guard processing circuit M60 according to this embodiment permits only a reduction in the current command value iγ* when the vehicle speed V is equal to or higher than the vehicle speed threshold value VL. Thus, in the high vehicle speed state, this embodiment prevents the current command value iγ* from being set at a level higher than necessary so as to preclude generation of an excessively high assist torque.

The following description discusses the association between the features mentioned in SUMMARY OF THE INVENTION and the features mentioned in DETAILED DESCRIPTION OF EMBODIMENTS.

The steering control apparatus corresponds to the control apparatus 50. The power converting circuit corresponds to the inverter 40. The current control circuit corresponds to the γδ converting circuit M26, the difference calculating circuit M28, the difference calculating circuit M30, the current feedback circuit M32, the current feedback circuit M34, the αβ converting circuit M36, the uvw converting circuit M38, and the manipulate signal generating circuit M40. The phase-control angle manipulating circuit corresponds to the dead band processing circuit M52, the target torque setting circuit M53, the update amount calculating circuit M54, and the update processing circuit M56. The threshold value corresponds to the specified value TrqL1. The expression "to perform feedback control such that a detection value of a steering torque corresponds to a target torque by the phase-control angle manipulating circuit" means "to set the target torque at a value equal to the detection value when the detection value (i.e., the steering torque Trqs) is equal to or smaller than the predetermined value TrqL2", and "to set the target torque at a value obtained by subtracting the predetermined value TrqL2 from the detection value when the detection value is greater than the predetermined value TrqL2".

The expression "a preceding value of the current command value subjected to the guard process is increased in magnitude by a specified amount so as to obtain a lower limit guard value, and the guard processing circuit is configured to perform the guard process such that the current command value is equal to or greater in magnitude than the lower limit guard value, the guard process being performed on condition that the exceeding amount is equal to or greater than the threshold value" means carrying out steps S32 and S34 on condition that the determination is YES in step S30. Step S34 in FIG. 4 may be cancelled when the determination in step S50 or S54 is YES. Thus, the guard process involving step S34 in FIG. 4 is performed when the logical product of the fact that the determination in steps S50 and S54 is NO and the fact that the determination in step S30 is YES is true. The lower limit guard value corresponds to iγ*(n−1)+ΔL.

The expression "the guard processing circuit is configured to perform the guard process on the current command value set by the command value setting circuit, in a manner that does not permit an increase in the absolute value of the current command value, the guard process being performed on condition that the exceeding amount is smaller than the threshold value" means carrying out steps S46 and S48. The absolute value guard process corresponds to steps S50 to S56.

At least one of the features of the above embodiments may be modified as described below.

The increase correction amount Δi by which the absolute value of the γ axis current command value iγ1* is increased when the exceeding amount (i.e., the amount by which the steering torque Trqs exceeds in magnitude the target torque Trqs*) is equal to or greater than the specified value TrqL1 does not necessarily have to be constant but may vary in accordance with the exceeding amount. In one example, assuming that the exceeding amount (i.e., the amount by which the steering torque Trqs exceeds in magnitude the target torque Trqs*) is equal to or greater than the specified value TrqL1, the increase correction amount Δi used when the exceeding amount is large may be greater than the increase correction amount Δi used when the exceeding amount is small.

The reduction correction amount Δd by which the absolute value of the γ axis current command value iγ1* is reduced when the exceeding amount (i.e., the amount by which the steering torque Trqs exceeds in magnitude the target torque Trqs*) is below the specified value TrqL1 does not necessarily have be constant but may vary in accordance with the exceeding amount. In one example, assuming that the exceeding amount is below the specified value TrqL1, the reduction correction amount Δd used when the exceeding amount is small may be greater in absolute value than the reduction correction amount Δd used when the exceeding amount is large.

Steps S16 to S22 do not necessarily have be carried out. In one example, assuming that the total number of times step S12 has been carried out is defined as a first total count and the total number of times step S14 has been carried out is defined as a second total count, execution of step S12 may be permitted on condition that a value obtained by subtracting the second total count from the first total count is equal to or smaller than a first determination value. In this case, execution of step S14 may be permitted on condition that a value obtained by subtracting the first total count from the second total count is equal to or smaller than a second determination value.

The command value setting circuit does not necessarily have to gradually increase the absolute value of the γ axis current command value iγ1*. In one example, the increase correction amount Δi may be equal to or greater than the upper limit iγ*max so as to increase the absolute value of the γ axis current command value iγ1*. In this case, the feedback processing circuit M54b would suitably exercise control if the specified value TrqL1 is equal to the predetermined value TrqL2.

The command value setting circuit does not necessarily have to gradually reduce the absolute value of the γ axis current command value iγ1*. In one example, the reduction correction amount Δd and the overheat reduction correction amount ΔD may each be equal to or greater than the upper limit iγ*max so as to reduce the absolute value of the γ axis current command value iγ1*. Alternatively, only the overheat reduction correction amount ΔD may be equal to or greater than the upper limit iγ*max.

In the above embodiments, the variation guard process involves setting the lower limit guard value such that when the exceeding amount (i.e., the amount by which the steering torque Trqs exceeds in magnitude the target torque Trqs*) is equal to or greater than the specified value TrqL1, the current command value iγ* is greater than the preceding value iγ*(n−1) by the specified amount ΔL or more. Alternatively, the lower limit guard value may be any other value. In one example, the lower limit guard value may be the preceding value iγ*(n−1) so as not to permit a reduction from the preceding value iγ*(n−1). In such a case, the first embodiment, for example, will prevent a situation where the current command value iγ* decreases because of a systematic error although the exceeding amount (i.e., the amount by which the steering torque Trqs exceeds in magnitude the target torque Trqs*) is equal to or greater than the specified value TrqL1.

In the above embodiments, the specified amount ΔL by which the current command value iγ* is increased when the exceeding amount (i.e., the amount by which the steering torque Trqs exceeds in magnitude the target torque Trqs*) is equal to or greater than the specified value TrqL1 is smaller than the increase correction amount Δi. Alternatively, the specified amount ΔL may be any other amount. In one example, the specified amount ΔL may be equal to the increase correction amount Δi. In this case, the specified amount ΔL by which the current command value iγ* is reduced in step S44 when the exceeding amount is below the specified value TrqL1 is preferably equal to or smaller than the reduction correction amount Δd.

In the above embodiments, the predetermined amount ΔH is greater than the increase correction amount Δi. Alternatively, the predetermined amount ΔH may be any other amount. In one example, referring to FIG. 4, the specified amount ΔL may be smaller than the increase correction amount Δi, and the predetermined amount ΔH may be equal to the increase correction amount Δi.

One example may involve, instead of carrying out steps S46 and S48, carrying out the process of limiting the present value iγ*(n) of the current command value iγ* such that the present value iγ*(n) is equal to or smaller than a value obtained by subtracting a predetermined value from the preceding value iγ*(n−1). Referring to FIG. 4, this predetermined value is smaller than the specified amount ΔL.

The overheat specified amount ΔLL used in step S72 may be replaced with the overheat reduction correction amount ΔD. Referring to FIG. 4, when the exceeding amount (i.e., the amount by which the steering torque Trqs exceeds in magnitude the target torque Trqs*) is equal to or greater than the threshold value, the guard process is performed such that a reduction in the current command value iγ* is not permitted. The threshold value in this case is the specified value TrqL1. The threshold value, however, is not limited to the specified value TrqL1. In one example, assuming that the specified value TrqL1 is smaller than the predetermined value TrqL2, the threshold value may be between the specified value TrqL1 and the predetermined value TrqL2.

When the exceeding amount (i.e., the amount by which the steering torque Trqs exceeds in magnitude the target torque Trqs*) is equal to or greater than the threshold value, one example involves carrying out a guard process using a lower limit guard value but does not involve carrying out a guard process using an upper limit guard value. In this case, subsequent execution of steps S50 to S56 prevents an excessive increase in the absolute value of the current command value iγ*.

The absolute value guard process does not necessarily have to involve carrying out steps S50 to S56. In one example, when the command value setting circuit M24 carries out the process steps illustrated in FIG. 5, the absolute value guard process may skip steps S50 and S52. In another example, the guard processing circuit M60 may carry out the process steps illustrated in FIG. 7 other than steps S50 and S52. In such cases, the absolute value guard process involves reducing the current command value iγ* because an excessive increase in the current command value iγ* results in an increase in the temperature Tm of the synchronous motor 34 and/or an increase in the temperature Ti of the inverter 40.

In the above embodiments, the specified temperature Tth is used as both of the lower limit to the temperature Tm of the synchronous motor 34 and the lower limit to the temperature Ti of the inverter 40 so as to determine overheat of the synchronous motor 34 and the inverter 40. The lower limits to the temperature Tm of the synchronous motor 34 and the temperature Ti of the inverter 40, however, are not limited to the specified temperature Tth.

In the above embodiments, the CPU 52 determines whether the logical sum of the fact that the temperature Tm of the synchronous motor 34 is equal to or higher than the specified temperature Tth and the fact that the temperature Ti of the inverter 40 is equal to or higher than the specified temperature Tth is true. Overheat may be determined in any other suitable manner. In one example, the CPU 52 may determine only whether the temperature Tm of the synchronous motor 34 is equal to or higher than the specified temperature Tth. In another example, the CPU 52 may determine only whether the temperature Ti of the inverter 40 is equal to or higher than the specified temperature Tth.

The temperature Tm of the synchronous motor 34 does not necessarily have to be detected by the temperature sensor 66. Alternatively, the temperature Tm of the synchronous motor 34 may be measured on the basis of the magnitude of the current flowing through the synchronous motor 34 and duration of the current flow, for example. In this case, the temperature Tm of the synchronous motor 34 is determined to be equal to or higher than the specified temperature Tth when the current flowing through the synchronous motor 34 is equal to or greater than a specified value for a specified period of time or longer.

The temperature Ti of the inverter 40 does not necessarily have to be detected by the temperature sensor 68. Alternatively, the temperature Ti of the inverter 40 may be measured on the basis of the magnitude of the current flowing through the inverter 40 and duration of the current flow, for example. In this case, the temperature Ti of the inverter 40 is determined to be equal to or higher than the specified temperature Tth when the current flowing through the inverter 40 is equal to or greater than a specified value for a specified period of time or longer.

In the third embodiment, step S70a (i.e., the step of determining whether the overheat protection process should be carried out by the guard processing circuit M60) is the same as step S62 (i.e., the step of determining whether the overheat flag F should be set to 1 by the command value setting circuit M24). The invention, however, is not limited to this embodiment. In one example, the command value setting circuit M24 may set the overheat flag F to 1 when the current flowing through the inverter 40 is equal to or greater than a specified value for a specified period of time or longer, and the guard processing circuit M60 may carry out the step of determining whether the temperature Ti of the inverter 40 detected is equal to or higher than the specified temperature Tth.

The features of the above embodiments may be combined where technically possible. In one example, the second embodiment may involve performing steps S100 to S104 according to the fourth embodiment before performing steps S30 to S48 (i.e., the variation guard process) and steps S50 to S56 (i.e., the absolute value guard process).

The phase-control angle manipulating circuit is not limited to the configurations illustrated in the above embodiments. In one example, the update amount Δθc1 may be calculated by only a proportional element that receives a difference between the target torque Trqs* and the steering torque Trqs1. In another example, the update amount Δθc1 may be calculated by only an integral element. In still another example, the update amount Δθc1 may be calculated by proportional, integral, and differentiating elements.

Performing the update amount guard process in accordance with the estimated variation ω1 is not essential. In the above embodiments, the phase of the current flowing through the synchronous motor 34 is controlled such that the current flowing through the synchronous motor 34 falls within a region between the positive sides of the d and q axes of the rotary coordinate system. The phase of the current flowing through the synchronous motor 34, however, may be controlled in any other suitable manner. In one example, the phase of the current flowing through the synchronous motor 34 may be controlled such that the current flowing through the synchronous motor 34 falls within a region between the positive side of the q axis and the negative side of the d axis. In this example, because the d axis current is negative, field-weakening control is carried out so as to facilitate torque production of the synchronous motor 34 that is rotated at high speed. It is to be noted that in this case, the estimated value base guard processing circuit M54c performs an upper limit guard process such that the update amount Δθc is smaller in magnitude than the estimated variation ω1 when the steering torque Trqs1 is large.

The steering control apparatus does not necessarily have to include the CPU 52 and the memory 54 so as to carry out only software processes. In one example, at least one or some of the process steps performed by software in the foregoing embodiments may be performed by dedicated hardware (e.g., ASIC). Specifically, the processes to be performed by the guard processing circuit M60, for example, may be hardware processes, and the CPU 52 may acquire the current command value iγ* from a hardware device.

The synchronous motor is not limited to a surface permanent magnet synchronous motor (SPMSM) but may be an interior permanent magnet synchronous motor (IPMSM). The steering device does not necessarily have to include a rack and pinion type steering actuator. Alternatively, the steering device may include any other type of steering actuator, such as a rack-cross type electric power steering (RC-EPS) system, a rack-parallel type electric power steering (RP-EPS) system, or a rack direct-drive type electric power steering (RD-EPS) system. RC-EPS, RP-EPS, and RD-EPS are registered trademarks of JTEKT CORPORATION.

What is claimed is:

1. A steering control apparatus for controlling a steering device to assist a driver in steering a vehicle, the steering device including a synchronous motor to generate an assist torque, and a power converting circuit to apply a voltage to the synchronous motor,
the steering control apparatus comprising:
a current control circuit to manipulate a voltage to be applied to the synchronous motor from the power converting circuit so as to adjust a current flowing through the synchronous motor to a current command value;
a phase-control angle manipulating circuit to manipulate a phase-control angle so as to perform feedback control such that a detection value of a steering torque corresponds to a target torque, the phase-control angle determining a phase of the current command value, the steering torque being a torque input to a steering shaft of the steering device;
a command value setting circuit to increase an absolute value of the current command value on condition that an amount by which the detection value exceeds in magnitude the target torque is equal to or greater than a threshold value, and reduce the absolute value of the current command value on condition that the exceeding amount is smaller than the threshold value; and
a guard processing circuit to perform a guard process on the current command value set by the command value setting circuit, in a manner that does not permit a reduction in the absolute value of the current command value, the guard process being performed on condition that the exceeding amount is equal to or greater than the threshold value.

2. The steering control apparatus according to claim 1, wherein
a preceding value of the current command value subjected to the guard process is increased in magnitude by a specified amount so as to obtain a lower limit guard value, and
the guard processing circuit is configured to perform the guard process such that the current command value is equal to or greater in magnitude than the lower limit guard value, the guard process being performed on condition that the exceeding amount is equal to or greater than the threshold value.

3. The steering control apparatus according to claim 1, wherein
the command value setting circuit is configured to reduce the current command value when at least one of a temperature of the synchronous motor and a temperature of the power converting circuit is determined to be equal to or higher than a specified temperature, and
the guard processing circuit is configured to, when at least one of the temperature of the synchronous motor and the temperature of the power converting circuit is equal to or higher than the specified temperature, perform the guard process on the current command value in a manner that permits a reduction in the magnitude of the current command value if the exceeding amount is equal to or greater than the threshold value.

4. The steering control apparatus according to claim 3, wherein
the guard processing circuit is configured to, when at least one of the temperature of the synchronous motor and the temperature of the power converting circuit is determined to be equal to or higher than the specified temperature, perform the guard process on the current command value in a manner that reduces the magnitude of the current command value if the exceeding amount is equal to or greater than the threshold value.

5. The steering control apparatus according to claim 1, wherein
the guard processing circuit is configured to perform the guard process on the current command value set by the command value setting circuit, in a manner that does not permit an increase in the absolute value of the current command value, the guard process being performed on condition that the exceeding amount is smaller than the threshold value.

6. The steering control apparatus according to claim 1, wherein
the guard process is a variation guard process, and
the guard processing circuit is configured to carry out an absolute value guard process such that the current command value subjected to the variation guard process is between upper and lower limits inclusive.

7. The steering control apparatus according to claim 1, wherein the guard processing circuit is configured to determine whether a speed of the vehicle is equal to or higher than a vehicle speed threshold value before performing the guard process, and the guard processing circuit is configured to permit only a reduction in the current command value when the speed of the vehicle is equal to or higher than the vehicle speed threshold value, and perform the guard process when the speed of the vehicle is lower than the vehicle speed threshold value.

* * * * *